United States Patent [19]
Hitomi

[11] Patent Number: 6,095,008
[45] Date of Patent: Aug. 1, 2000

[54] FACE GEAR FOR SPINNING REEL

[75] Inventor: Yasuhiro Hitomi, Hashimoto, Japan

[73] Assignee: Shimano Inc., Sakai, Japan

[21] Appl. No.: 09/101,884

[22] PCT Filed: Nov. 20, 1997

[86] PCT No.: PCT/JP97/04238

§ 371 Date: Jul. 20, 1998

§ 102(e) Date: Jul. 20, 1998

[87] PCT Pub. No.: WO98/21941

PCT Pub. Date: May 28, 1998

[30] Foreign Application Priority Data

Nov. 22, 1996 [JP] Japan ................................. 8-312127

[51] Int. Cl.[7] .......................... F16H 55/06; F16H 55/22; A01K 89/02
[52] U.S. Cl. .................. 74/446; 29/893.37; 242/247; 242/249
[58] Field of Search ............... 74/446; 29/893.37; 242/247, 249

[56] References Cited

U.S. PATENT DOCUMENTS

| | | | |
|---|---|---|---|
| 3,520,488 | 7/1970 | Vouthier | 242/84.21 |
| 3,530,735 | 9/1970 | Allen | 74/446 |
| 4,957,072 | 9/1990 | Goldowsky | 123/55 A |
| 5,074,832 | 12/1991 | Igaku | 475/317 |
| 5,271,287 | 12/1993 | Wadleigh | 74/446 |
| 5,546,824 | 8/1996 | Miller et al. | 74/421 R |

FOREIGN PATENT DOCUMENTS

| | | |
|---|---|---|
| 2 480 890 | 10/1981 | France . |
| 38 23 910 | 1/1990 | Germany . |
| 57-164575 | 10/1982 | Japan . |
| 59-168052 | 11/1984 | Japan . |
| 61-67453 | 5/1986 | Japan . |
| 62-215164 | 9/1987 | Japan . |
| 2 039 662 | 8/1980 | United Kingdom . |

*Primary Examiner*—Allan D. Herrmann
*Attorney, Agent, or Firm*—Shinjyu An Intellectual Property Firm

[57] ABSTRACT

A spinning reel master gear 11 (face gear) is a gear provided on a handle shaft 10 of a spinning reel, and comprises a circular plate 11a, and a tooth ring 11b manufactured of zinc alloy that is formed by a post-molded insert process on the perimeter of the circular plate 11a, which is manufactured of aluminum alloy.

4 Claims, 5 Drawing Sheets

FACE GEAR FOR SPINNING REEL

BACKGROUND OF THE INVENTION

A. Field of the Invention

The present invention relates to face gears, in particular to face gears provided on the handle shaft of spinning reels.

B. Description of Related Art

Generally spinning reels have a reel main body, a rotor supported for free rotation on the main body, and a spool that peripherally winds on fish line, provided toward the front of the rotor. The rotor rotates unitarily with a pinion gear provided peripherally on the spool axle. The spool shuttles back and forth by means of a level-wind mechanism that is driven by an intermediate gear that meshes with the pinion gear. The pinion gear meshes with a face gear (master gear) provided on a handle rotation axle (handle shaft) that is orthogonal to the pinion gear, and is rotated by rotation of the handle. The face gear is usually formed incorporated with the handle shaft. Conventionally zinc alloys have been comparatively widely used as a material for cheaply manufacturing the face gear which includes the handle shaft, and for maintaining its strength.

Generally with spinning reels, designing to make them lightweight to elevate casting performance is important. Further, it is also important to improve corrosion resistance in order to prolong their life-span. With the above-noted conventional face gear, however, since zinc alloys of high relative density that are inferior in corrosion resistance are utilized, their heavy weight makes lightweight design difficult, and moreover improving corrosion resistance is problematic.

Therein, consideration has been given to using aluminum alloys as a face gear material for designing the face gear to be lightweight, and further to using stainless steel alloys as a face gear material in order to improve the corrosion resistance. Due to the inferior strength of aluminum alloys compared to zinc alloys, along with inferior manufacturing precision wherein die-casting or the like is to be carried out, however, when utilizing aluminum alloys as a face gear material, the strength and precision of the teeth of the face gears deteriorates. Furthermore, while stainless steel alloys are of better strength compared to zinc alloys, owing to poor workability along with problems generally in injection molding, it is difficult to improve precision; when employing stainless steel alloys the precision of the face gear teeth is liable to deteriorate.

It is an object of the present invention to provide for a lightened-weight face gear while maintaining its strength and precision.

Another object of the present invention is to provide for improvement of corrosion resistance of a face gear while maintaining its strength and precision.

SUMMARY OF THE INVENTION

A spinning reel face gear in connection with invention 1 is a gear provided on the handle shaft of the spinning reel, and is furnished with a circular plate, and a tooth ring formed on the perimeter of the circular plate of a material different from the circular plate. With this face gear, because the tooth ring that is to be the meshing portion is formed of a separate material from the circular plate, it is possible to design a lightened face gear of improved anti-corrosiveness, maintaining its strength and precision, by manufacturing the circular plate with lightweight materials and materials that are anti-corrosive, and by manufacturing the tooth ring with materials by which its strength and precision are maintainable.

A spinning reel face gear in connection with invention 2 is a gear set forth by invention 1, wherein the handle shaft is formed unitarily with the circular plate. Herein, since the handle shaft and circular plate are formed unitarily, the number of parts is reduced, and the manufacturing costs and assembly costs are decreased.

A spinning reel face gear in connection with invention 3 is a gear set forth by invention 1 or 2, wherein the fabrication material of the circular plate is aluminum alloy or stainless steel alloy, and the tooth ring fabrication material is zinc alloy or synthetic resin. Herein, the circular plate can be lightened and designed for improved anti-corrosiveness; moreover, zinc-alloy or high-strength synthetic-resin manufactured teeth make the maintenance of strength and precision possible.

A spinning reel face gear in connection with invention 3 is a gear set forth by any of inventions 1 through 3, wherein the tooth ring is formed on the perimeter of the circular plate by a post-molded insert process. Herein, the circular plate, in which if formed as a single body with the tooth ring bending and warping are liable to occur, depending on its weight and thickness, is specially manufactured; and by making this a parent material, the tooth ring can be formed by a post-molded insert process, and therefore it is possible to heighten the precision of the teeth further and to improve the meshing precision.

DETAILED DESCRIPTION OF THE INVENTION

Figure 1:
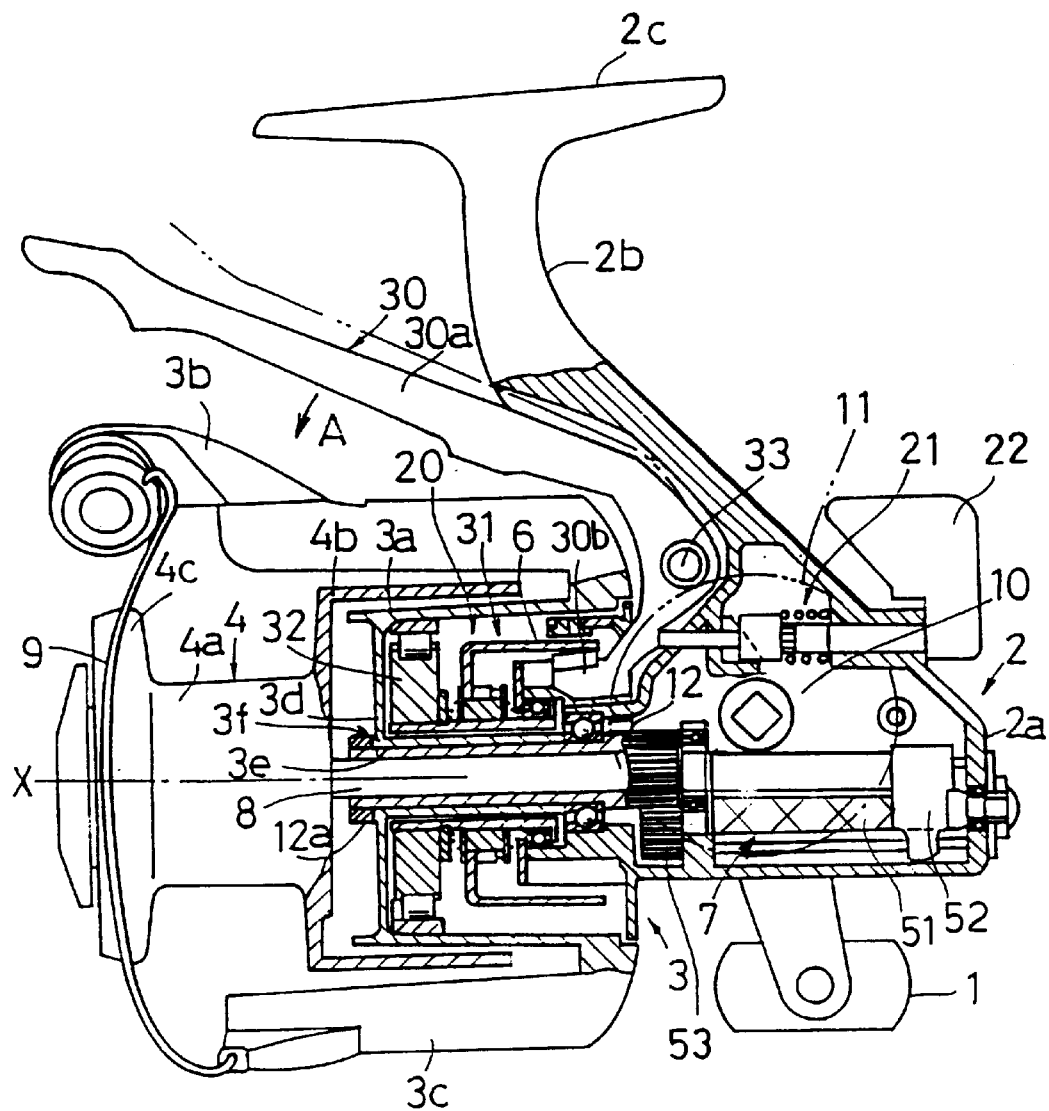
FIG. 1 is a cross-sectional view of a lateral portion of a spinning reel in which an embodiment of the present invention is adapted.

The spinning reel shown in FIG. 1 in which an embodiment of the present invention is adapted is provided with a reel main body 2 furnished with a handle 1, a rotor 3 supported for spinning on the front portion of the reel main body 2, and a spool 4 that winds on fish line and is disposed on the front portion of the rotor 3.

The reel main body 2 has a body 2a, and a fastening part 2b is formed on its upper portion for fastening the spinning reel onto a fishing rod. The upper surface of the fastening part 2b forms a mount 2c that attaches to a fishing rod. A rotor drive mechanism 5 for spinning the rotor 3, a rotor braking mechanism 6 for braking the rotor 3, and a level-wind mechanism 7 for uniformly winding fish line onto the spool 4 by shifting the spool 4 back and forth along rotational axial core X, are provided in the interior of the body 2a.

The rotor 3 comprises a cylindrical part 3a and mutually opposing first and second arms 3b and 3c provided laterally of the cylindrical portion 3a. A boss 3f is formed in the center of a front wall 3d of the cylindrical part 3a, and has a through hole 3e through which a spool axle 8 and a pinion gear 12 (described later) pass. A bail 9 is provided for swinging between the tip end of the first arm 3b and the tip end of the second arm 3c.

The spool 4 is disposed between the first arm 3b and the second arm 3c of the rotor 3 and is attached to the tip end of the spool axle 8. The spool 4 comprises a line-winding trunk 4a peripherally onto which fishing line is wound, a skirt 4b integrally formed on the rear of the line-winding trunk 4a, and a flange 4c fixed to the front end of the line-winding trunk 4a. By means of level-wind mechanism 7 the spool axle 8 is able to shuttle back and forth.

The rotor drive mechanism 5 includes a handle shaft 10 to which the handle 1 is fixed, a master gear 11 employing a face gear rotatable with the handle shaft 10, and a pinion gear 12 meshed with the master gear 11.

Figure 2:
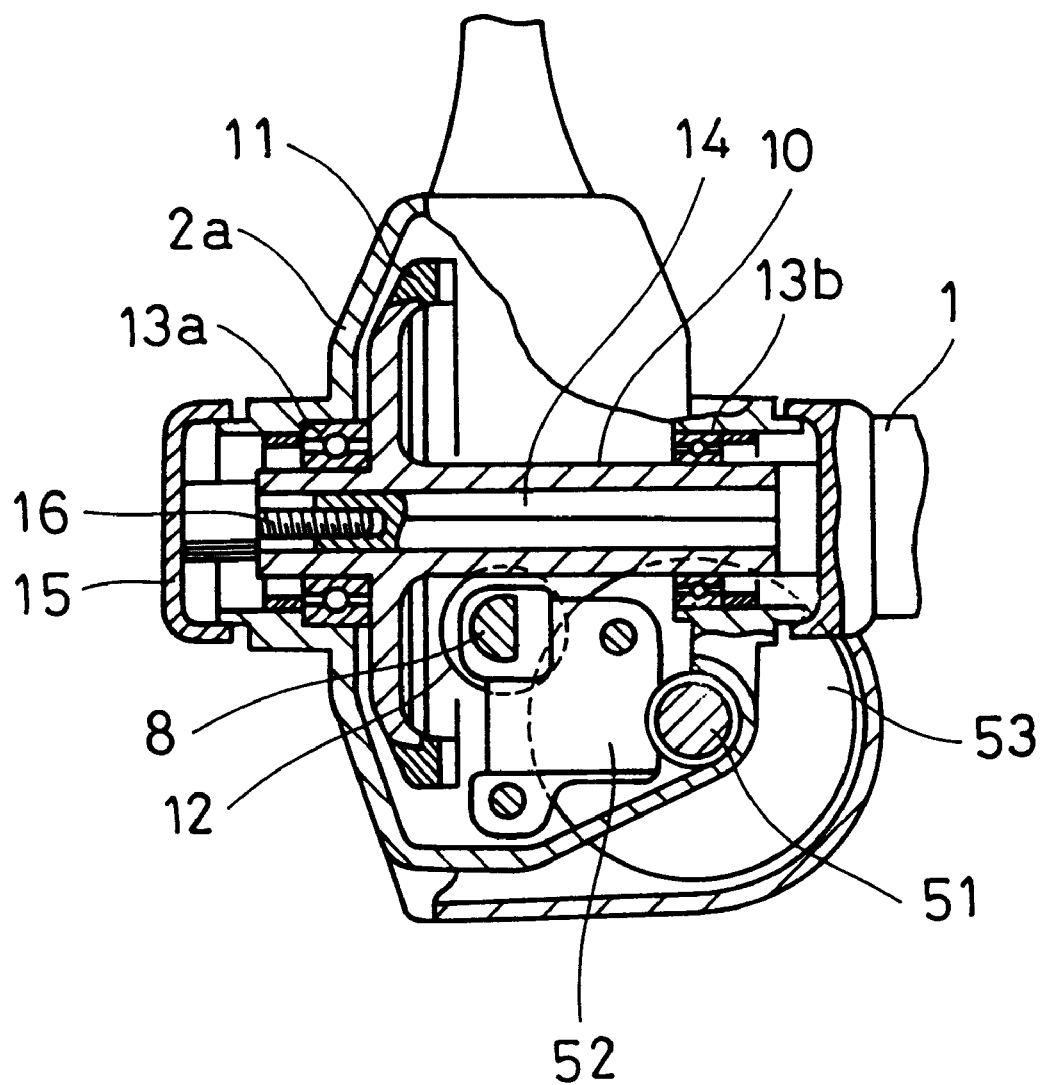
FIG. 2 is a cross-sectional vie of its rear face.

The handle shaft 10, as shown in FIG. 2, is disposed transverse to the body 2a of the reel 2, and is supported for rotation on bearings 13a and 13b.

The master gear 11 is formed unitarily with the handle shaft 10. An axle body 14 extending from the handle 1 and square in cross section is inserted non-rotatably into the center the handle shaft 10. The axle body 14 is fixed by a screw 16 which extends from a cap 15 attached to the side of the body 2a. By this construction, the handle 1 is detachable and moreover can be disposed on either the right or left side of the reel main body 2.

Figure 3:
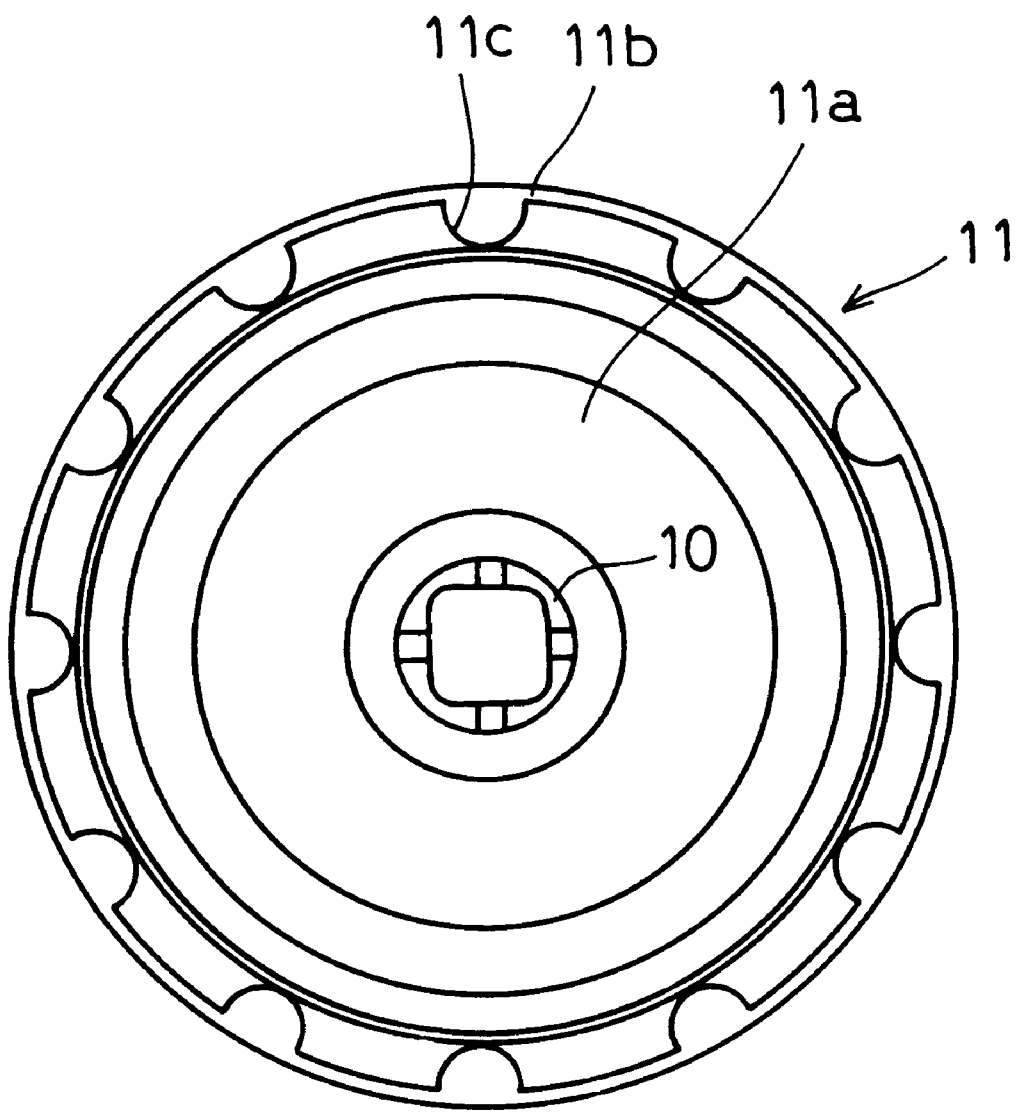
FIG. 3 is an elevation of a master gear.
Figure 4:
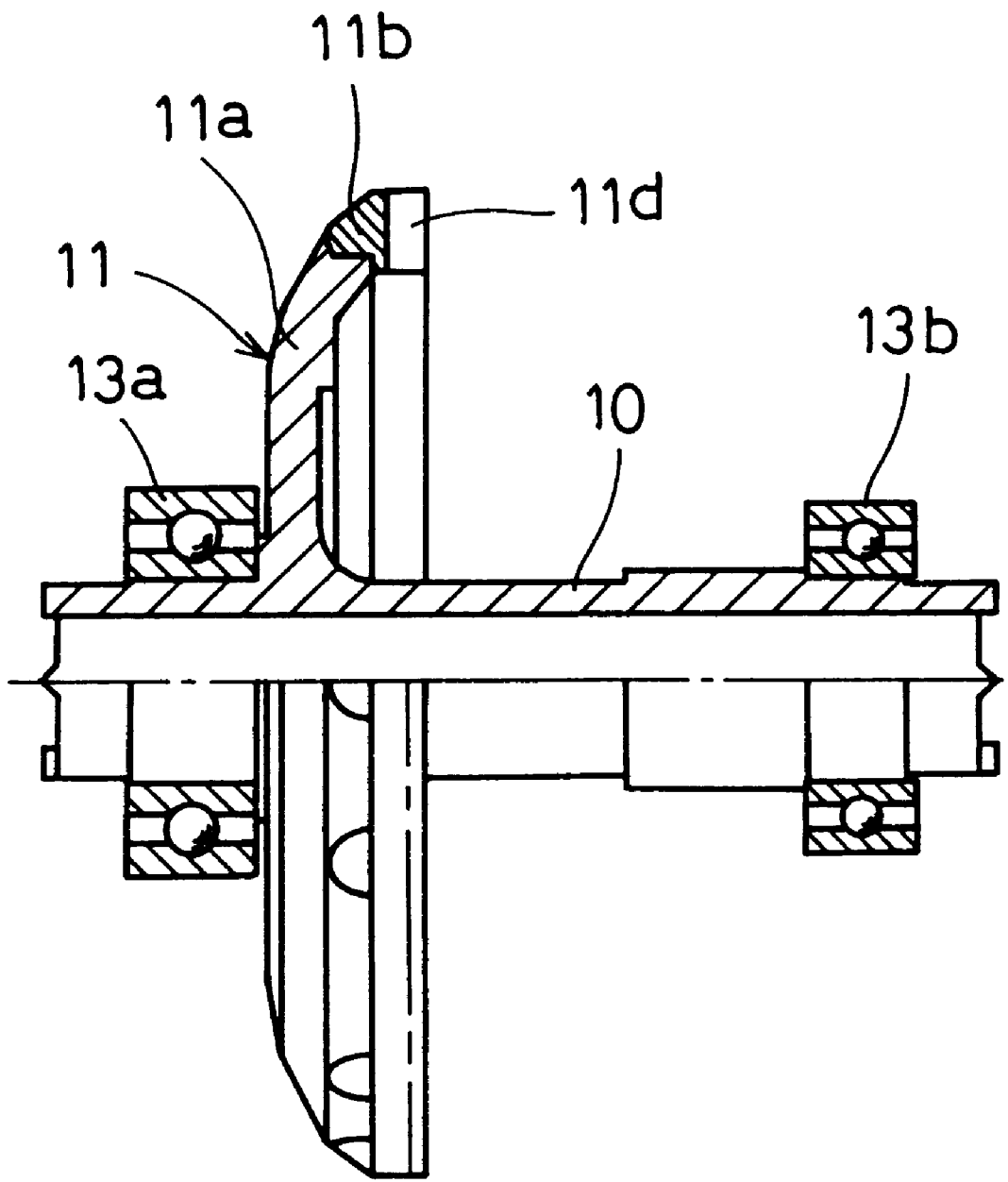
FIG. 4 is a fragmentary cross-sectional view of the master gear.

The master gear 11, as shown in FIGS. 3 and 4, is provided with a circular plate 11a unitarily with the handle shaft 10, and a tooth ring 11b formed on the perimeter of the circular plate 11a of a material different from the circular plate 11a. As a fabrication material for the circular plate 11a, aluminum alloy may be utilized in order to lighten the design. Also, stainless steel alloy may be utilized in order to improve anti-corrosiveness in the design. As a fabrication material for the tooth ring 11b, for maintaining strength and precision zinc alloy or those high-strength synthetic resins which are the so-called "engineering plastics" such as polyacetal and nylon resin, may be utilized. Circumferentially spaced semi-circular indentations 11c are formed on the perimeter of the circular plate 11a, and teeth 11d that serve as the face gear are formed terminally on tooth ring 11b. By the formation of these indentations 11c, the adhesiveness between the circular plate 11a and the tooth ring 11b is improved, and torque is reliably transmitted from the circular plate 11a to the tooth ring 11b. The tooth ring 11b is formed unitarily on the perimeter of the circular plate 11a by a post-molded insert process, with the circular plate 11a as a base material. The pinion gear 12 is cylindrically formed and is disposed beneath the handle shaft 10, along a longitudinal direction orthogonal to the handle shaft 10. The front portion 12a of the pinion gear 12 passes through the center of the rotor 3, extending toward the spool 4.

The rotor braking mechanism 6 has, as shown in FIG. 1, a brake 20 and a brake retaining mechanism 21 for retaining the brake 20 in its braking state. The brake retaining mechanism 21 has a pivot lever 22 pivotably supported by the body 2a. The pivot lever 22 enables switching a later-mentioned brake lever 30 between a braking position and a braking release position, and moreover makes it possible to maintain the brake lever 30 in the braking position.

The brake 20 is provided with a brake lever 30 pivotably supported by the body 2a, a brake main body 31 that is braked by the brake lever 30, and a one-way clutch 32 which operates to let the brake main body 31 rotate in only the rotational direction of the rotor 3 in which line is wound out.

The brake lever 30 is pivotably supported on body 2a by means of a support axle 33 in the boundary portion between the body 2a and the fastening part 2b, and furthermore is urged counter-clockwise in FIG. 1 by a not-shown urging element. The brake lever 30 has a manipulation lever 30a that extends in a curve from the support axle 33 diagonally upward, and on the end which extends in a curve from the support axle 33 diagonally downward brake operating portion 30b is provided. The tip end of the manipulation lever 30a is disposed adjacent to the mount 2c.

Figure 5:
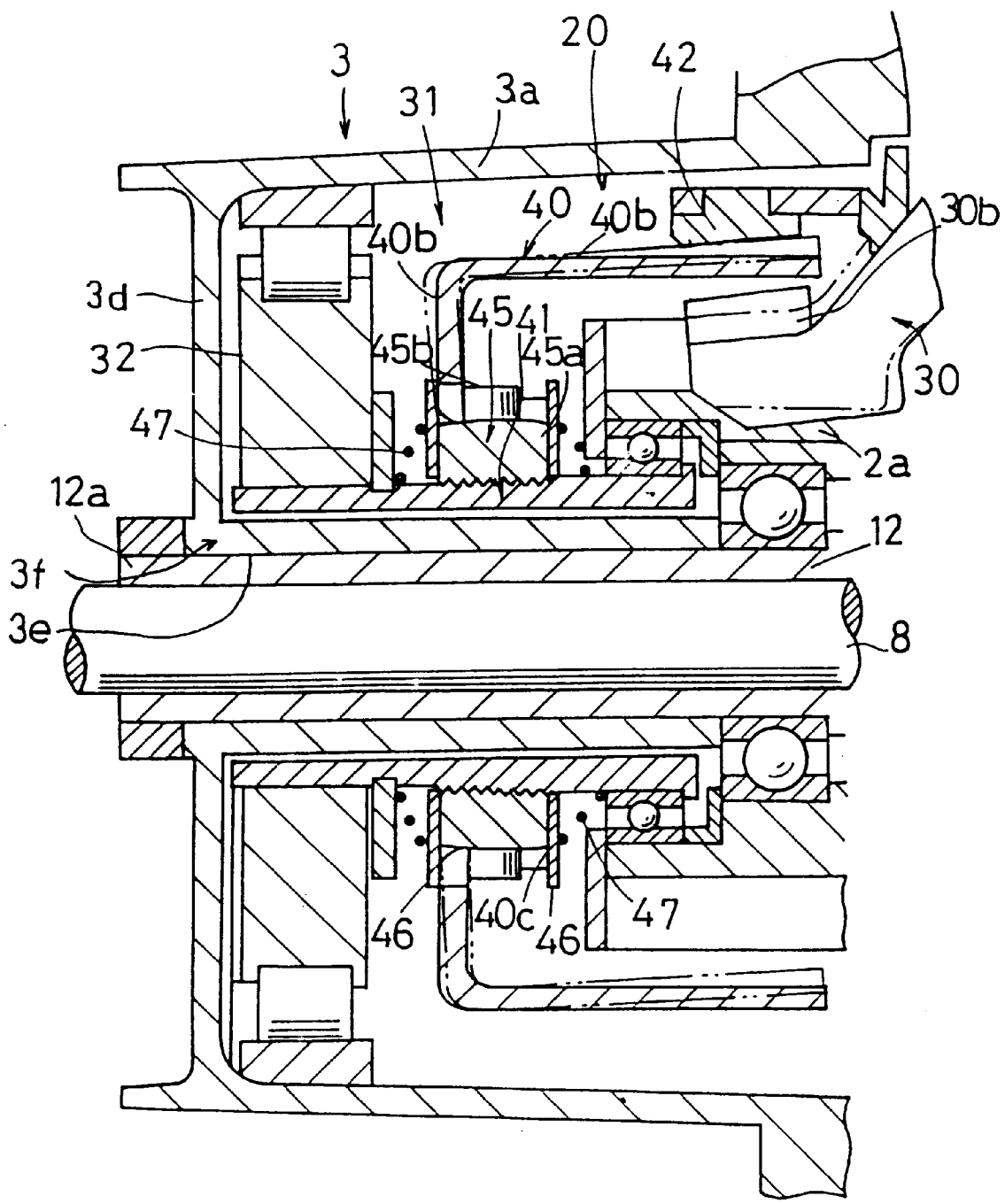
FIG. 5 is an enlarged cross-sectional view of essential parts of a braking section.

The brake main body 31 has, as shown in FIG. 5, a brake cylinder 40 coaxially located along the inner peripheral side of the rotor 3, a rotation cylinder 41 that supports the brake cylinder 40 to be pivotable yet not able to rotate, and a brake shoe 42 attached to the body 2a.

The brake cylinder 40 is of a cylindrical form having a bottom. An end 40a of the outer peripheral surface of the brake cylinder 40 is disposed between the brake shoe 42 and the brake operation portion 30b of the brake lever 30. The brake cylinder 40 has, in the central portion thereof, a support surface 40c bent folding inward. The support surface 40c is cylindrical. On the bottom surface 40b of the brake cylinder 40 a cross-shaped engagement groove 43 is formed. The engagement groove 43 extends to the end of the support surface 40c.

The front end of the rotation cylinder 41 is rotated unitarily by the one-way clutch 32 in the rotational direction of the rotor 3 in which line is wound out, and is supported so as not to respond to the rotor 3 torque during winding; the rear end of the rotation cylinder 41 is supported by the body 2a for rotation on a bearing 44. A universal joint 45 is provided on the circumferential mid-portion of the rotation cylinder 41 for supporting the support surface 40c. The universal joint 45 has a rotation ring 45a formed on the circumferential surface in a segmental sphere surface and screwed onto the rotation cylinder 41, and four round engagement nubs 45b protruding outward from the peripheral surface of the rotation ring 45a in cross formation. The engagement nubs 45b engage with the engagement grooves 43; and in the supporting of the support surface 40c by the rotation ring 45a, the brake cylinder 40 is supported non-rotatably yet pivotably on the rotation cylinder 41.

A pair of spring receiving rings 46 is disposed on either side of and in contact with the rotation ring 45a. Between the right spring receiving ring 46 and the bearing 46 and between the left spring receiving ring 46 and the one-way clutch 32 conical coil springs 47 are disposed in a compressed state for maintaining the end of the brake cylinder 40 in a predetermined attitude in which the rim of the brake cylinder 40 does not contact the brake shoe 42 and the brake operation portion 30b of the brake lever 30.

Accordingly, since the brake cylinder 40 is supported non-rotatably yet pivotably on the rotation cylinder 41 that the brake cylinder 40 tilts into the position indicated by the double-dotted broken line in FIG. 2 when the brake is applied by the brake lever 30. However, since the brake cylinder 40 is pivotably supported on the rotation cylinder 41, when braking the rotation cylinder 41 and the pinion gear 12 are not liable to being acted upon by the bending moment or to being put out of whack, nor are they liable to exert influence on the rotation of the rotor 3 or to bring about rotational drag.

The one-way clutch 32 is an outer-race free type in which an outer race is fixed to the cylindrical portion of the rotor 3, and an inner race is fixed to the peripherally on the end of the rotation cylinder 41. The one-way clutch 32 transmits torque to the rotation cylinder 41 only in the direction the rotor 3 is rotated in winding out line. Therefore, when the rotor 3 is rotated in the winding-out line direction, the rotation cylinder 41 rotates and braking by the brake mechanism 6 is possible. On the other hand, when the rotor 3 is rotated in the line-winding direction, the rotation cylinder 41 does not rotate and braking by the brake mechanism 6 is not possible.

The level-wind mechanism 7, as shown in FIGS. 1 and 2, is a mechanism for shifting the spool 4 in a back and forth direction by shifting the spool axle 8 fixed to the center of the spool 4 in the same direction. The level-wind mechanism 7 has a spiral axle 51 disposed beneath the spool axle 8, a slider 52 that shifts back and forth along the spiral axle 51, and an intermediate gear 53 fixed to an end of the spiral axle 51. The spiral axle 51 is disposed parallel to the spool axle 8 and is rotatably supported by the body 2a. Further, screw grooves 51a are formed on the periphery of the spiral axle 51. The slider 52 is fixed to the rear end of the spool axle 8. The intermediate gear 53 meshes with the pinion gear 12.

When casting, the bail 9 is flung toward the line release position and the fishing rod is swung out, and the fishing line wound on the spool 4 is wound out.

When the fishing line is to be reeled in, the bail 9 is put back into the line-winding position. When the handle 1 is rotated in this situation, the torque is transmitted to the pinion gear 12 through the handle shaft 10 and the master gear 11. Since zinc alloy or high-strength synthetic resin likewise as is conventional is used in the tooth ring 11b of the master gear 11, in transmitting torque from the master gear 11 to the pinion gear 12, their strength and precision are maintained. Moreover, since aluminum alloy or stainless steel alloy is used in circular plate 11a it is possible to design for lightening or improvement in anti-corrosiveness.

Torque transmitted to the pinion gear 12 is transmitted to the rotor 3 through the front portion 12a of the pinion gear 12. Herein, since the rotor 3 rotates in the line winding direction, due to the one-way clutch 32 the torque, as stated before, is not transmitted to the rotation cylinder 41. Moreover, when the pinion gear 12 rotates, the rotation is transmitted to the level-wind mechanism 7 by means of the intermediate gear 53, and the spool axle 8 shifts back and forth in the longitudinal direction.

When the rotor 3 is reversed to play a fish, the pivot lever 22 is swung 45 degrees to the left into the braking release state. In so doing, the brake lever 30 is restored into the braking release position by the (not shown) urging element. The brake lever 30 is manipulated in this situation to play out a fish. If the fishing line is tugged by a fish, reversing the rotor 3, as stated before, the torque is transmitted to the rotation cylinder 41 through the one-way clutch 32, and further is transmitted through the universal joint 45 to the brake cylinder 40, whereby the brake cylinder 40 rotates unitarily with the rotor 3. Then, when the brake lever 30 is pivoted in the direction opposite arrow A in FIG. 1, the brake operation portion 30b presses on the inner periphery of the end 40a of the outer peripheral surface of the brake cylinder 40, tilting the brake cylinder 40 into the position indicated by the double-dotted broken line in FIG. 5, compressing the outer periphery of the end 40a of the outer peripheral surface against the brake shoe 42. This results in a braking action on the rotor 3 in reversing.

By adding or reducing the force put on the brake lever 30, it is possible to adjust the braking force at will by adjusting the amount by which the rotor 3 is reversed. Therein, further, since the brake cylinder 40 is pivotably supported on the rotation cylinder 41 by the universal joint 45, the force does not act on the pinion gear 12 so as to put it out of whack, and there is no drag on the rotation of the rotor 3. Since an outer-race free type one-way clutch 32 is utilized, the higher the spinning speed is, both reversing and spinning at high-speed the rotation of the rotor 3, the more the action during the onset of braking is stable.

When the fishing spot is moved or the reel is stored, the pivot lever 22 is pivoted from 45 degrees to the left to 45 degrees to the right, pivoting the brake lever 30 into the braking position.

Other Embodiments (a) In the above-mentioned embodiment, the circular plate 11a of the master gear 11 is of aluminum-alloy or stainless steel-alloy, and the tooth ring 11b is of zinc-alloy or high-strength synthetic-resin manufacture; the present invention, however, is not limited by these, and such metals as titanium alloys that are lightweight and in which the anti-corrosiveness is high may be utilized for the circular plate 11a in order to lighten it and design for improvement in anti-corrosiveness. Further, other alloys that readily maintain strength and the precision may be utilized the tooth ring 11b.

(b) Although in the above-mentioned embodiment, the master gear 11 and the handle shaft 10 are integrated, they may be separate members also.

(c) The present invention is not limited to a spinning reel face gear put onto a brake lever, but also may be applied to front-drag type or rear-drag type spinning reels or to other spinning reels.

(d) The tooth ring may be manufactured by cutting work. The cutting work may be done either before joining or after joining to the circular plate.

(e) The tooth ring may be formed by molding and the teeth shape may be rectified post-molding with a tool known as a pinion cutter. Generally, pinion cutters are utilized which have the same form as the companion pinion gear to be meshed with, and by shifting the meshing position of the cutter from its regular position, teeth rectification known as crowning or relieving is carried out on the surface of the face gear; however, on the cutter itself the teeth may be rectified beforehand so as to get the face gear into such form.

Industrial Applicability

With a spinning reel face gear in connection with the present invention, because the tooth ring that is to be the meshing portion is formed of a separate material from the circular plate, it is possible to design a lightened face gear of improved anti-corrosiveness, maintaining its strength and precision, by manufacturing the circular plate with light-weight materials and materials that are anti-corrosive, and by manufacturing the tooth ring with materials by which its strength and precision are maintainable.

What is claimed is:

1. A face gear combined with a handle shaft for a spinning reel, the face gear comprising:

an anti-corrosive alloy plate formed with a dished rim having circumferentially spaced indentations; and an axially toothed ring post-molding inserted into the indentations and bonded to the dished rim of said anti-corrosive alloy plate.

2. The face gear set forth in claim 1, wherein said axially toothed ring consists of one selected from zinc alloy or synthetic resin, and wherein said anti-corrosive alloy plate consists of one selected from aluminum alloy or stainless steel alloy.

3. The face gear set forth in claim 1, wherein the handle shaft for a spinning reel is formed unitarily with said anti-corrosive alloy plate.

4. The face gear set forth in claim 1, wherein said indentations are semi-circular.

\* \* \* \* \*